United States Patent [19]
Duvall et al.

[11] 3,815,773
[45] June 11, 1974

[54] CYCLIC PRESSURE VESSEL

[75] Inventors: Paul F. Duvall; W. Donald Humphrey; Thomas E. Timberlake; Ralph F. Foral, all of Lincoln, Nebr.

[73] Assignee: Brunswick Corporation, Skokie, Ill.

[22] Filed: May 17, 1971

[21] Appl. No.: 144,351

[52] U.S. Cl. .................................... 220/3, 220/83
[51] Int. Cl. ...................................................... F25j
[58] Field of Search ........................... 220/3, 83, 71

[56] References Cited
UNITED STATES PATENTS

| | | | |
|---|---|---|---|
| 2,744,043 | 5/1956 | Ramberg | 220/3 X |
| 2,848,133 | 8/1958 | Ramberg | 220/3 |
| 3,079,038 | 2/1963 | Rossi et al. | 220/83 |
| 3,137,405 | 6/1964 | Gorcey | 220/3 |
| 3,266,660 | 8/1966 | Ragettli | 220/83 X |
| 3,293,860 | 12/1966 | Stedfeld | 220/71 X |
| 3,312,575 | 4/1967 | Corbin, Jr. | 220/3 X |
| 3,508,677 | 4/1970 | Laibsom et al. | 220/3 |

Primary Examiner—Samuel B. Rothberg
Assistant Examiner—James R. Garrett

[57] ABSTRACT

A lightweight, composite metal lined pressure vessel is made by providing a load distribution layer and a shear-slip plane interleaved between the external resin impregnated fiber housing and the metal liner. The pressure vessel is capable of withstanding repeated cyclic pressurization and depressurization. The vessel is impermeable to the fluids, gases and liquids, stored therein. Methods of making such pressure vessels require special processing techniques.

19 Claims, 7 Drawing Figures

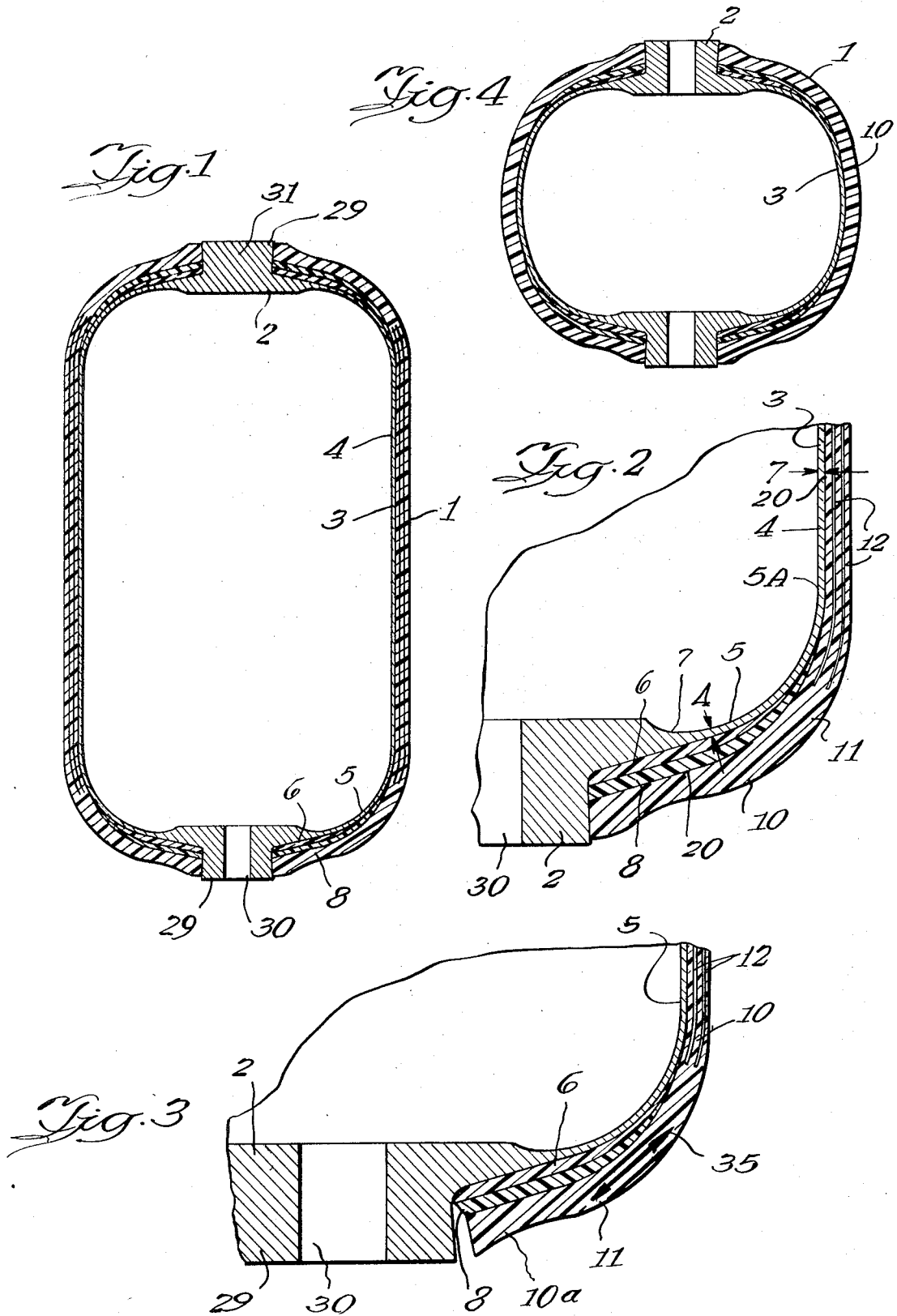

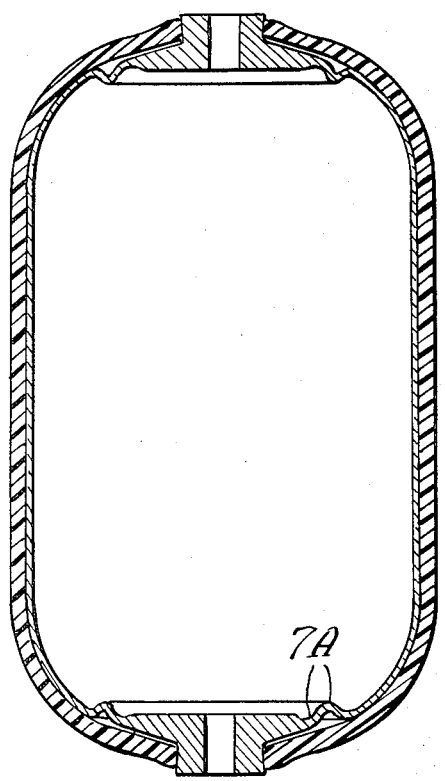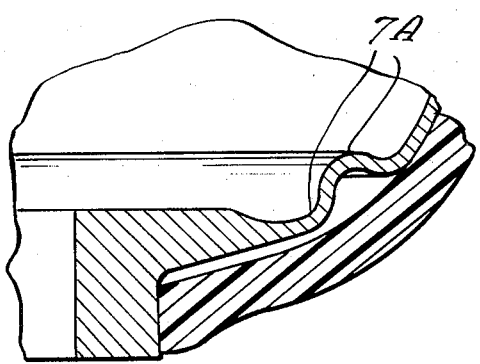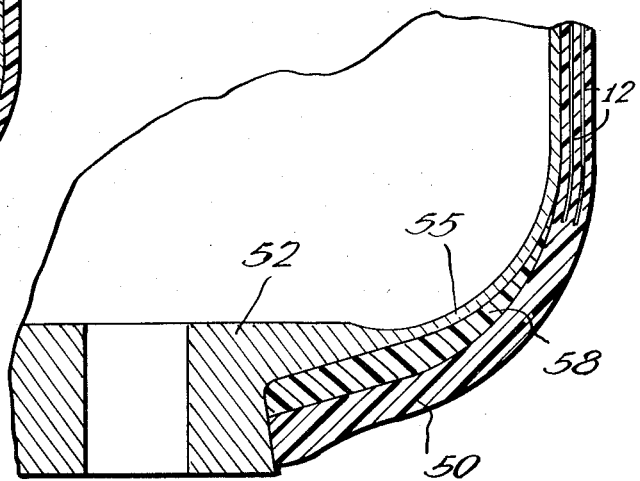

CYCLIC PRESSURE VESSEL

FIELD OF THE INVENTION

This invention is in the field of pressure vessels, and more particularly, in the field of pressure vessels capable of storing fluids under extreme degrees of repeated cyclic pressurization and depressurization without significant leakage; and methods of constructing such vessels.

BACKGROUND OF THE INVENTION

Generally, pressure vessels can be any size or configuration. These vessels may be heavy or light, single use (throw-aways), reusable, subjected to high pressures (as used hereinafter to mean pressures greater than 50 psi), low pressures (less than high pressures), used for storing fluids (gases and/or liquids) at elevated or cryogenic temperatures.

A long time requirement has existed in aircraft, spacecraft and industrial fields for lightweight pressure vessels capable of (1) storing fluids under high pressures (both liquids and gases), (2) sustaining repeated cyclic pressurization and depressurization, (3) being impermeable to such liquids and gases contained therein, and (4) being non-shatterable when rapidly externally punctured. It is well known that oxygen and acetylene have been stored in massive metal pressure vessels that are clumsy, top-heavy (creating safety problems), and a remnant of industrial complacency and indifference.

Quite to the contrary, the aircraft-spacecraft industries have always been extremely weight conscious and safety conscious. These industries continually strive to find new components that will perform the same function but are lighter in weight. Concomitantly, itantly, these industries continually strive to push the state-of-the-art because of their new and more severe design requirements.

It has been acknowledged that filament wound pressure vessels are capable of withstanding severe structural loads caused by operating pressures of several thousand pounds per square inch and at weight to volume ratios considerably less then metal structures. However, structures fabricated by conventional filament winding means are too porous to retain gases and, in fact, will only contain liquids at relatively low working pressure levels. Several approaches are considered commonplace for reducing leakage including the use of rubber and thermo-plastic liners, used either as liners alone or built into the structural wall of the pressure vessel. These techniques do not reduce leakage sufficiently to provide a "leak free" pressure vessel because the materials used have some inherent permeability to the fluids being stored therein. It has also been recognized that many potential applications can only be satisfied by using nonpermeable (metal) liners. Because the efficient operating strain limit of filament wound structures such as fiber glass reinforced materials is three to ten times that of most metal liner materials, it was apparent that a conventional design wherein both he liner and the structure operate within the elastic limits would be much heavier than that required to resist the loads created by repeated cyclic pressurization-depressurization. It was also found that conventional designs have heretofore not solved this problem.

Attempts were made to utilize fatigue life of the metal liner materials beyond their elastic limit which had limited success if the pressure vessel were used just once. However, continuous use of pressurizing and depressurizing these vessels met with failure.

Other attempts to store highly pressurized fluids, such as gases, are taught in U.S. Letters Pat. No. 3,508,677; however, this teaching does not describe a vessel capable of cyclic pressurization-depressurization. This teaching is directed to a plastic resin interliner having a rubber coating with an outer exterior housing of filament wound fiber glass strands impregnated with plastic resin. It is well understood in the art that the permeabilities of the gas containing portions, the resin liner rubber coating, is permeable and/or not inert to a large number of gases and incapable of completely containing a leak free system.

It has been recognized that a logical extension of the art would be to make a pressure vessel having a structure comprising of a thin metal liner (as it is well known that metal liners are impermeable to fluids, i.e. gases, and liquids), a rubber coating and a filament wound housing; or a vessel comprising a thin metal liner and a filament wound housing. However, these vessels are incapable of sustaining repeated cyclic pressurization-depressurization. The strain at the elastic limit of the metal liner is in the range of 0.1% to 1% and the strain at the elastic limit of the filament wound housing is in the range of 0.5% to 3.5%. In order for such a vessel to operate, the elastic limit of the metal liner had to be exceeded during pressurization. Upon depressurization localized buckling occurs in the dome section of the metal liner causing failure due to mismatch of the elastic limits of the respective materials. In addition strain failure of the bonding in the filament wound housing and the metal liner also occurred during cyclic pressurization and depressurization contributing to the failure of the pressure vessel. It has been found that this localized buckling failure of the metal liner occurs primarily at the junction where the thick metal flanges or port fittings are attached to the thin metal liner. One obvious solution would be to make the metal liner thicker thereby eliminating localized buckling strain point. However, this would require a much heavier liner that would not exceed the strain at the elastic limit during repeated pressurization and depressurization and thereby substantially obviating the need for a filament wound housing. The resulting structure would simply be a heavy metal pressure vessel thereby failing to meet the new needs for a lightweight pressure vessel. It can be readily understood that the prior art attempts have failed to achieve a solution to the problem of providing a lightweight pressure vessel, impermeable to the fluids stored therein, and capable of withstanding repeated pressurization and depressurization.

SUMMARY OF THE INVENTION

This invention relates to pressure vessels and is concerned with a new and novel lightweight pressure vessel capable of containing fluids, gases, and liquids, under repeated cyclic pressurization and depressurization. The invention also relates to new and novel methods for making such pressure vessels.

It is an object of this invention to provide a lightweight filament wound pressure vessel with a thin metal inner liner capable of containing fluids and operating under repeated cyclic pressurization and depressurization wherein the elastic limit of the metal liner is continually exceeded.

Another object of this invention is to provide methods for fabricating such pressure vessels.

A feature of this invention is the provision for a load distribution layer secured to the dome portion of the vessel to act as a reinforcement thereof forming a composite material.

Another feature of this invention is the provision that such a load distribution layer drastically reduces the localized high stress area on the dome portion of the pressure vessel at the metal flange-metal liner junction.

Yet another feature of this invention is to provide a reinforcement for the metal dome liner in order to preclude high local strains.

And yet another feature of this invention is the provision for a shear-slip interfacing between the load distribution layer and the filament wound housing thereby permitting the housing to act as the primary load carrying element during both pressurization and depressurization.

Still another feature of the invention is the provision for eliminating the load distribution layer and yet provide the desired pressure vessel.

The invention broadly contemplates a pressure vessel that has a thin metal liner and is impermeable to the fluids, liquids and gases, desired to be stored therein. The metal liner is supplied with thick metal polar cap fittings secured to the metal liner at the dome portions, becoming integral therewith. Generally, the iner has a cylindrical center portion adjacent each dome. At least one of these fittings has an opening therein to provide access into the tank. (The thinness of the metal liner is such that if it were pressurized by the introduction of a fluid at about 50 psi to 150 psi depending on the metal wall thickness relative to the diameter of the liner), it would rupture immediately. A reinforcing load distribution layer of material such as resin impregnated fiber glass fabric may be placed over the dome portions of the metal liner and bonded thereto. Thus, the dome portion can be defined as a composite structure comprising one material having a low strain at the elastic limit (the metal liner) and another material having a higher strain at the elastic limit (the resin impregnated fabric). This provides a composite material wherein an area that is prone to be subjected to a localized strain, as at the liner-cap junction, is reinforced so that the strain is widely distributed over most of the dome area.

A shear-slip interfacing such as an elastomer, is bonded to the reinforcing layer. The metal liner with the layer and interfacing secured at the domes is then covered with a plurality of filament wound layers comprising the housing that are bonded to each other and to the cylindrical portion of th metal liner and the dome interfacings. Any number of desired filament wound layers can be used. At the junction between the dome and the cylindrical portion of the fessel, it has been found advantageous to use slip planes between one or more housing layers. These slip planes are limited to the dome-cylinder junction. Thus, such a pressure vessel can be repeatedly pressurized and depressurized even though the elastic strain limit of the liner has been exceeded. The reinforcing layer distributes the localized strain load of the metal liner-cap junction thereby preventing localized buckling and the interfacing transfer to a significant portion of the pressurization load to the housing. This, in turn, enables the housing to exert a restrictive or compressive load on the metal dome portions. The methods required in making such a vessel require special techniques in building the composite structure pressure vessel.

The above and other and further objects and features will be more readily understood by reference to the following detailed description and the accompanying drawings.

DESCRIPTION OF THE DRAWINGS

FIG. 1 is a cross-section view of an embodiment of a pressure vessel;

FIG. 2 is an enlarged partial cross-sectional view of FIG. 1;

FIG. 3 is an enlarged partial cross-sectional view of FIG. 1 when the vessel is pressurized;

FIG. 4 is a cross-section view of another embodiment of the pressure vessel;

FIG. 5 is a cross-section view of a pressure vessel that is not an embodiment of the invention and depicts the prior art failures;

FIG. 6 is a partial enlarged cross-sectional view of FIG. 5; and

FIG. 7 is a partial enlarged cross-sectional view of another embodiment of the invention.

DEFINITIONS

For better understanding of the invention the following terms, as used herein, are defined and mean:
1. "plastic strain" is the percentage of strain that a material is subjected to by a force wherein after the force is removed, the material does not return to its original size; "plastic strain" takes place only in the plastic deformation regime or when the material has exceeded its yield point; and,
2. "elastic strain limit" is the maximum precentage of strain that a material is subjected to by a force wherein after the force is removed, the material returns to its original shape; "elastic strain" takes place only in the elastic deformation regime where the material has not exceeded its yield point; if the "elastic strain limit" is exceeded, then the material is in the plastic deformation regime.

DESCRIPTION OF THE PREFERRED EMBODIMENTS

This invention relates to providing a lightweight fluid pressure vessel that is capable of operating at repeated cyclic high and low pressures and is impermeable to the fluid stored therein. It will be obvious to those skilled in the art that such vessels will also be applicable to less stringent conditions. These pressure vessels generally have a cyclic life (pressurization-depressurization, one cycle) ranging from 100 cycles to 100,000 cycles. The cyclic life can vary with the operating pressures which generally range from 0 psi to 1,500 psi and from 0 psi to 10,000 psi. It is also obvious that the liner of the vessel must be selected to be inert with respect to the fluid being contained therein; this is simply a matter of proper material selection.

In a preferred embodiment of the invention, the pressure vessel can have a generally cylindrical shape as shown in FIG. 1 or a ball shape as shown in FIG. 4. The pressure vessel 1 has a metal inner liner 3 having a cylindrical portion 4 and dome portions 5. Secured to and integral with the dome portions 5 are the polar flange caps 2 having externally portruding bosses 29. At least one cap 2 with its boss 29 has an opening 30 therein to provide access to the inside of the liner 3. Means (such as a screw thread, not shown) can be provided within the opening 30 to attach other hardware thereto (not shown). The other cap 2 with a boss 29 can be solid as shown at 31 or with an opening as shown at 30, as desired. The metal liner can be made of materials including Type 304 stainless steel, Type 321 stainless steel, Type 347 stainless steel, aluminum. aluminum alloys, nickel, nickel alloys, titanium, titanium alloys, platinum, but not limited thereto. These metals used to make up the metal liner can be further characterized in that each has a high modulus of elasticity, generally 10 million psi or greater and a low elastic strain limit, generally ranging from 0.05% to about 1%. Since these metals will be used for a pressure vessel liner that is subjected to repeated cyclic stresses, cyclic fatigue will reduce the usable life thereof. The liner ratio is defined as the cylindrical diameter of the liner divided by the thickness of the metal wall. This ratio can vary from 20 to 500 depending upon the vessel's application.

Referring to FIG. 2, the junction between the dome portion 5 and the cylindrical portion 4 is at 5a. A load distribution reinforcing layer 6 is bonded by an adhesive to the dome portion 5 covering the dome-cap junction 7 but not extending as far as the dome-cylinder junction 5a. The reinforcing layer 6 is made from material including filaments of fibers of glass, metal, carbon, graphite, boron, synthetics, in roving or fabric form, but not limited thereto. The roving or fabric is impregnated with resinous materials including epoxies, polyamides, polyimides, polyesters, polyoelfins, silicons, polyurethanes, combinations thereof but not limited thereto. The thickness of the layer 6 can range from 0.012 inch to 0.500 inch, or be smaller or greater as desired.

It has been found desirable that the reinforcing layer 6 should have a higher elastic strain limit than the metal liner material. This elastic strain limit ranges from about 0.5% to about 3.5% with the preferable range of about 1% to about 3%. When the metal liner 3 is made from stainless steel havng elastic strain limit of 0.2% then it has been found desirable that the reinforcing layer 6 has an elastic strain limit designed to operate at about 1.5%. By their very nature, composite or laminated materials can be designed to have a preselected elastic strain limit. It is contemplated within the scope of this invention that the metal liner 3 will be subjected to internal pressurization that results in the liner exceeding its tensile elastic strain limit. When this pressure is removed, the liner does not return to its original size since it has passed its yield point. If the metal liner is over-wrapped with a filament wound housing such as resin impregnated fiber glass, buckling in the liner occurs at the dome-cap junction 7a as shown in FIG. 5 and FIG. 6. It is obvious that the localized buckling will occur at 7a since it defines an area where the metal liner undergoes a drastic reduction in thickness therby being the location of the weakest point or the highest stress concentration. The reinforcement layer 6 functions to substantially reduce the stress concentrations at 7 and distribute the load over a major portion of the dome 5. Thus, the reinforcing layer 6 and the dome 5 act as a composite material providing a synergistic effect for a thin metal wall pressure vessel.

A shear-slip interfacing 8 is placed adjacent the reinforcing layer 6 and may be bonded thereto, if desired.

In one preferred embodiment of the invention, the shear-slip interfacing 8 can be an elastomer or rubbery polymer made from materials including chlorobutyl rubber, SBR, neoprene, silicone rubber, polyvinylchlorode, polyvinylalchol, but not limited thereto. The interfacing 8 may be characterized as having an elastic strain limit greater than 10% and having a low modulus of elasticity of less than 300,000 psi and preferably in the range of 500 psi to 5,000 psi. For cryogenic applications, the shear-slip interfacing can be a low friction material including Teflon TFE (polytetrafluoroethylene), Teflon FEP (tetrafluoroethylene-hexafluoropropylene co-polymers), but not limited thereto. The thickness of the interfacing is a function of the material used and the pressure vessel size and application.

The remaining exposed portion of the metal liner 3 and the interfacing 8 are coated with a resinous adhesive 20 and then covered with a plurality of resin impregnated filament wound layers 11. These layers 11 are bonded to each other defining the structural housing 10. In addition, the housing 10 is bonded to the liner 3 and the interfacing 8. The housing provides the major portion of the strength of the vessel. Any number of layers 11 may be used, as desired. Alternatively, and fully within the scope of this invention, resin impregnated fiber or filamentary fabric can be substituted for the filament winding layers 10, or a combination or resin impregnated filament winding layers and fabric layers can be used, if desired. In the area of the dome-cylinder junction 5a, it has been found desirable to use slip planes or low friction planes 12 between one or more preselected housing layers 11 to prevent undue strain on the inner and outer layers occasioned by repeated expansion and contraction of the vessel due to cyclic pressurization and depressurization. These slip planes 12 are limited to the dome-cylinder junction area 5a.

The shear-slip interfacing 8 permits the housing 10 to expand as the vessel 1 is pressurized and yet maintained the bonded integrity of the total structure. A portion of the vessel 1 in a pressurized mode is shown in FIG. 3. The shear-slip interfacing 8 is in the extreme shear condition; the structural housing 10 is in an expanded condition with the shell structure being in tension as depicted by a double pointed arrow at 35. However, the housing 10 exerts an inner compressive or restraining force on the dome liner portion 5 and the reinforcing layer 6 by means transmitted through the interfacing 8. Thus, a sufficient restraining force is exerted on the liner dome 5 so that no rupture or buckling occurs even though the liner dome 5 has exceeded its yield point.

The filament winding layers 11 (or the fabric) can be made from materials including filaments or fibers of glass, metal, carbon, graphite, boron, synthetics, in roving or fabric form, but not limited thereto. It is desirable that the housing layers 11 be impregnated with the same or similar resinous material as the reinforcing layer 6 so that both will have substantially the same or compatible physical characteristics, e.g., elastic strain limits. However, depending on the overall design of the vessel, this may be varied as desired.

In another embodiment of the invention, the interfacing layer 6 can be eliminated. By referring to FIG. 7 which is a cutaway sectional view of a pressure vessel, the polar flange cap 52 is very carefully and gradually tapered by precise machining to blend exactly with the dome portion 55 so that no stress concentration or weak spots occur. Thus, the need for a load distribution layer reinforcing the dome portion 55 is not required. The shear-slip interfacing 58 is bonded to the dome portion 55 and the housing 50. The housing 50 may be formed in the same manner as described above.

In order for any of the embodiments described herein to function properly, there must be discontinuity in the shear-slip interfacing 8 (58) between the polar dome portions 5 (55).

A wide variety of materials may be used as the impregnating resins for the reinforcing layer filaments and/or fabric and for the housing layers filament and/or fabrics which include epoxies, polyamides, polyimides, polyesters, polyoelfins, silicons, polyurethanes, combinations thereof, but not limited to. The adhesives used to bond the respective parts of the vessel may be the same materials as the resins compounded for use as adhesives.

Thus, having described the physical structure of the vessel itself, it is contemplated herein as part of this invention that the method of making such a vessel is both new and novel.

In a preferred method of making a thin metal lined pressure vessel, the metal liner is assembled from three fabricated parts; two dome portions and a cylindrical center portion. The following steps are illustrative of a method of making the pressure vessel:

a. Polar flange caps are attached to the dome such as by welding or any other suitable means;
b. The dome portions are then attached to the center portion again by welding or any other suitable means in order to form a unitized thin metal liner. Manufacturing techniques for making thin metal liners or tanks are well known in the art.
c. The metal liner than undergoes a complete cleaning operation coupled wit providing a smooth, semi-polished exterior surface.
d. The liner is pressure tested with gases and liquids both inside and outside a vacuum chamber.
e. The exterior surface of the liner is covered with priming sealer such as modified epoxies, polyamides, polyimides, polyesters, polyoelfins, silicons, and polyurethanes and then the sealer is cured in an oven at about 320° F. for about 1½ hours.
f. The exterior surface is covered with a resinous adhesive which is A-staged in an oven at about 150° F. for about 1 to 2 hours in order to drive off the volatile materials and yet substantially preventing cross linking of the resin to occur.
g. The dome portions are covered with a resinous coating and the reinforcing layers impregnated with the same resin are placed on the dome portions. (At this time, the whole external surface of the liner may be resin coated, if desired.)
h. The liner with the dome reinforcing layers is B-staged at approximately 135° F. for about 16 hours using banks of heat lamps.
i. The dome reinforcing layers are covered with an adhesive resin coating and the elastomeric shear-slip interfacing is placed over the dome reinforcing layers.
j. The whole exterior surface of the liner and the interfacing is resin coated followed by an initial filament winding with roving impregnated with resin. The roving is wound both longitudinally and circumferentially. Alternatively, the initial covering may be a fabric impregnated with resin and the subsequent coverings may also be fabric impregnated resin coverings. These techniques are well known to those skilled in the art with U.S. Letters Pat. No. 3,508,677 teaching one such method.
k. The total structure is placed in an oven, B-staged, then oven cured at a temperature of about 290° F. to about 325° F. for approximately 15 to 18 hours.

i. For large vessels, when the liner is too weak to support heavy windings, the vessel is first pressurized and then the remaining resin impregnated layers are placed on the structure. The number and thickness of layers are determined by the desired final structure.
m. The slip planes or friction planes are placed on the structure between the desired layers during filament winding. (In some instances, it is desirable to B-stage and cure progressively as the housing layers are added which requires that the structure is placed in an oven at a temperature of approximately 290° F. to 325° F. for about 15 to 18 hours to accomplish this desired result.)
o. After the vessel is completed, it is finally B-staged and cured in an oven at approximately 315° F. for approximately 18 hours.

For certain embodiments of the invention, a low friction shear-slip interfacing such as Teflon may be substituted for the elastomeric or rubbery polymer interfacing as included in step (i). However, it is not necessary to bond the Teflon interfacing to the reinforcing layer.

Since there are wide varieties of sizes of pressure vessels that can be made by this basic method, obviously variations in this processing are fully contemplated to be within the scope of this invention.

The following examples of specific pressure vessels made in accordance with this invention should not be construed in any way to limit the scope contemplated by this invention.

EXAMPLE I

A pressure vessel having a final outside diameter of about 45 inches, a length of about 90 inches, an inside diameter of about 41 inches, a volume of about 57 cubic feet and a weight of about 2,200 pounds was made starting with the metal liner having a thickness of about 0.125 inch. After cleaning and coating the liner with a priming sealer designed as BR-1009-49 which is a product made by the American Cyanamid Company, the primer was baked onto the liner in an oven at about 320° F. for about one and one-half hours. The liner domes were covered with a resin designated LRF. LRF comprises a mixture of the following:

| Parts by Weight | Designation |
|---|---|
| 100 | Epoxy–Shell Oil Company's "EPON 828" |
| 80 | Nadic Methyl Anhydride |
| 1 | Benzyl dimethyl amine |

The LRF resin was used throughout the manufacture of this vessel as both the impregnating resin and the adhesive. Reinforcing fabric layer were impregnated with resin and placed over each dome portion. The layer was about 15½ inches long and about ¼ inch thick. The vessel was then B-staged at about 135° F. for about 16 hours. The whole exterior of the surface was then covered with resin and a shear-slip interfacing made from Buna-N rubber was placed over each dome reinforcing layer. The interfacing was about 0.105 inch thick at the boss and tapered to about 0.015 inch; the interfacing being about 20 inches long. The vessel was then resin-coated and a set of 11 longitudinal and circumferential resin impregnated fiber glass roving layers was wound on the vessel. The vessel was pressurized to about 35 psig and then B-staged and cured in an oven at about 325° F. for about 12 hours. A second set of 16 longitudinal and circumferential resin impregnated fiber glass roving layers was wound on the vessel. Slip planes of Teflon FEP were placed adjacent to the dome-cylinder junction. A third set of 27 longitudinal and circumferential resin impregnated fiber glass roving layers was wound on the vessel. The vessel was then B-staged at about 150° F. for 8 hours and then cured at about 290° F. for about 15 hours. A second set of slip planes was added followed by a fourth set of 27 longitudinal and circumferential resin impregnated fiber glass roving layers being wound on the vessel. The vessel was then B-staged at about 150° F. for about 8 hours to compact the resin. A third set of slip planes was placed on the vessel followed by a fifth set of 27 longitudinal and circumferential resin impregnated fiber glass roving layers being wound on the vessel. The vessel was then B-staged at about 150° F. for about 8 hours and oven cured at about 315° F. for about 18 hours for the final time. The ratio of the inside diameter of the vessel to the liner thickness was about 328 to 1. The vessel was filled alteratively with water and freon at a pressure of 7,530 psig and then reduced to a pressure of 0 psi. The vessel was subjected to repeated cycling of more than 1,100 times at 0 psig – 4500 psig – o psig without showing any signs of leakage. The volume to weight ratio of this vessel was 45 cubic inches per pound.

EXAMPLE II

A pressure vessel having a final outside diameter of about 7 inches, a length of about 12.5 inches, an inside diameter of about 6.4 inches, a volume of about 300 cubic inches and a weight of about 7 pounds was made starting with the metal liner having a thickness of about 0.022 inch. After cleaning and coating the liner with a priming sealer designed as BR-1009-49 which is a product made by American Cyanamid, the primer was baked onto the liner in an oven at about 320° F. for about one and one-half hours. The liner domes were covered with a resin designated LRF. LRF comprises a mixture of the following:

| Parts by Weight | Designation |
|---|---|
| 100 | Epoxy–Shell Oil Company's "EPON 828" |
| 80 | Nadic Methyl Anhydride |
| 1 | Benzyl dimethyl amine |

The LRF resin was used throughout the manufacture of this vessel as both the impregnating resin and the adhesive. The reinforcing layer and the shear-slip interfacing were placed on the metal liner domes in same manner as described in Example I. The structure was then wound with 14 longitudinal and circumferential layers with two shear plies positioned opposite the liner-cylinder junction during the winding step, again in the same manner as Example I. The resultant vessel was B-staged and then cured in an oven at about 315° F. for approximately 6 to 7 hours. The ratio of the inside diameter of the vessel to the liner thickness was about 272 to 1. The vessel was filled with water at a pressure of 4,000 psi and then reduced to a pressure of 0 psi. The vessel was subjected to repeated cycling of more than 310 times without showing any signs of leakage. The volume to weight ratio of this vessel was 43.

It has been found in the preferred embodiments of the invention that the metal liner 3 provides generally not more than 10% of the strength of the vessel while the housing 10 provides 90% of the strength required, and in many instances as much as 95 to 98% of the strength of the vessel.

Thus, it has been readily shown how lightweight metal lined pressure vessels that can be repeatedly cyclicly pressurized and depressurized can be made. It is obvious that distinct advantages in safety and weight savings can be gained by using such a pressure vessel as described as a replacement in the aircraft, spacecaaft and ground industries. In addition, such pressure vessels open up new areas of technology.

Although specific embodiments of the invention have been described, many modifications and changes may be made in the structure and configuration of the pressure vessel, the methods of making the pressure vessel and in the materials used to make the desired pressure vessel, without departing from the spirit and the scope of the invention as defined in the appended claims.

We claim:

1. A pressure vessel for containing fluids comprising:
   a. a metal liner having domed end portions;
   b. metal caps with bosses, integral with the domed portions defining a junction therebetween;
   c. a resin impregnated filament housing substantially surrounding the liner and bonded thereto; and
   d. means secured to the housing and the liner extending substantially from the liner-cap junction to the boss providing a resilient bond therebetween.

2. The vessel of claim 1 further including means for maintaining the bond between the housing and the liner.

3. The vessel of claim 2 wherein said maintaining means comprises a load distributing interfacing covering only each dome portion.

4. The vessel of claim 2 wherein said maintaining means comprises a load distributing layer bonded to each dome and adjacent the liner-cap junction.

5. The vessel of claim 4 wherein said layer functions to distribute an internally generated pressure load over a substantial portion of the dome.

6. The vessel of claim 4 wherein said layer comprises a resin impregnated fabric.

7. The vessel of claim 6 wherein said fabric is formed from filament selected from a group consisting of glass, metal, carbon, graphite and boron.

8. The vessel of claim 2 wherein said maintaining means comprises a shear-slip interfacing adjacent each layer.

9. The vessel of claim 8 wherein said interfacing is bonded to said layer.

10. The vessel of claim 8 wherein said interfacing is selected from a group consisting of elastomers and rubbery polymers.

11. The vessel of claim 1 wherein said housing comprises longitudinal and circumferential filament wound roving layers.

12. The vessel of claim 11 wherein said roving is selected from a group consisting of glass, metal, carbon, graphite and boron.

13. A pressure vessel for containing fluids comprising:
   a. metal liner having dome end portions;
   b. metal caps integral with the dome portions;
   c. load distribution layers secured to each dome portion and covering a substantial portion thereof;
   d. low friction means overlying the layers and substantially covering a portion of same; and
   e. a resin impregnated filament housing substantially surrounding the liner and the low friction means, the housing being bonded to at least the metal liner.

14. The vessel of claim 13 wherein each layer comprises a resin impregnated fabric.

15. The vessel of claim 14 wherein said fabric is formed from filament selected from a group consisting of glass, metal, carbon, graphite and boron.

16. The vessel of claim 13 wherein said low friction means comprises an interfacing bonded to each layer.

17. The vessel of claim 16 wherein said interfacing is selected from a group consisting of elastomers and rubbery polymers.

18. The vessel of claim 13 wherein said housing comprises longitudinal and circumferential filament wound roving layers.

19. The vessel of claim 18 wherein said roving is selected from a group consisting of glass, metal, carbon, graphite and boron.

\* \* \* \* \*